July 26, 1955  N. E. BERRY  2,713,778
REFRIGERATION
Filed May 24, 1952
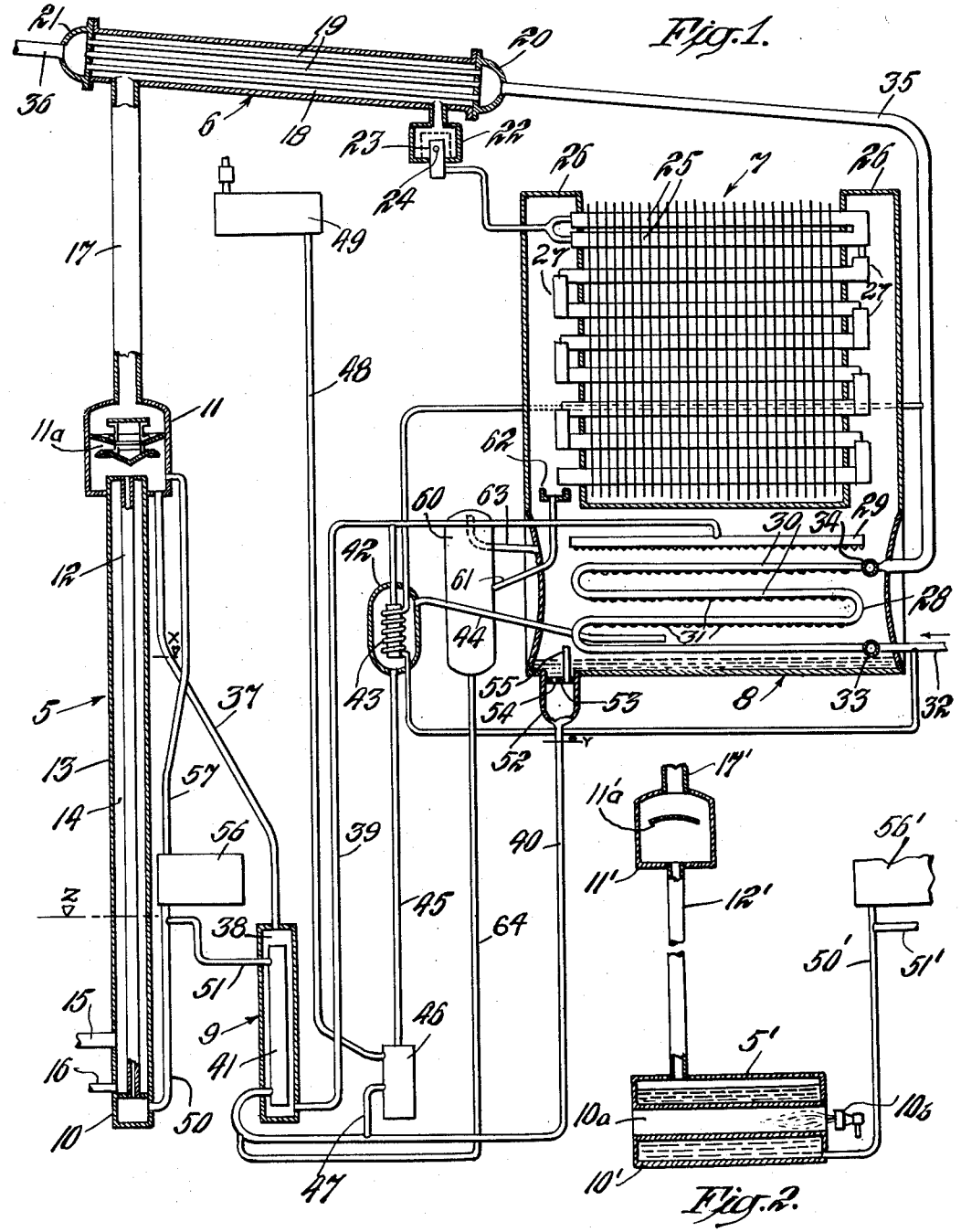
INVENTOR.
Norton E. Berry
BY
Oliver S. Titcomb
his ATTORNEY

United States Patent Office

2,713,778
Patented July 26, 1955

2,713,778
REFRIGERATION

Norton E. Berry, Newburgh, Ind., assignor to Servel, Inc., New York, N. Y., a corporation of Delaware Application May 24, 1952, Serial No. 289,760

10 Claims. (Cl. 62—119)

The present invention relates to refrigeration, and more particularly to the absorption solution circuit of an absorption refrigeration system.

In absorption refrigeration systems, and particularly in vacuum type systems, it has been the practice to expel refrigerant vapor from absorption solution in a generator by the application of heat and to utilize the expelled vapor to raise solution in a vapor liquid-lift for gravity flow through the absorber. To produce a controlled relative circulation of refrigerant and absorbent, a column of solution of substantially constant height is maintained on the vapor liquid-lift. This is accomplished by providing a reservoir vessel in the solution circuit between the absorber and lift which stores the surplus solution necessary to compensate for changes in operating conditions and provides a pool of solution at a predetermined level above the base of the vapor liquid-lift. The vessel has such lateral dimensions that variations in the amount of solution delivered thereto during operation of the system has little or no effect on the height of the liquid level therein so as to maintain a substantially constant hydrostatic reaction head on the lift. Such an arrangement has heretofore been considered necessary as the amount of liquid lifted in the lift is functionally related to the height of the reaction head.

Such an arrangement of elements in an absorption solution circuit operates satisfactorily to produce a controlled relative circulation of refrigerant and absorbent but under some conditions of operation is apt to produce an undesirable noise. The noise is caused by a sudden increase in vaporization in the generator causing an appreciable amount of solution to back out of the generator and into the column constituting the pressure balancing reaction head. Bubbles of vapor in the solution backing out of the generator collapse in the cooler liquid in the column producing a rather loud and sharp condensate knocking noise which is undesirable, especially in residences.

One of the objects of the present invention is to provide a novel construction and arrangement of elements to materially reduce the noise in the generator while producing a controlled relative circulation of refrigerant and absorbent in an absorption refrigeration system.

Another object is to provide a construction and arrangement of elements to feed solution to the generator at a constant rate and thereby regulate the rate at which solution is circulated by the lift and automatically vary the height of the hydrostatic reaction head responsive to variations in pressure in the generator to prevent any appreciable amount of solution from backing out of the generator.

Another object is to provide a standpipe connected to the generator and having a small cross-sectional area so that solution tending to back out of the vessel will immediately produce an increase in the height of the liquid column in the standpipe.

Still another object is to provide a construction and arrangement of elements for materially reducing the noise produced in the generator of an absorption refrigeration system which is of a simple and compact construction, economical to manufacture, and producing controlled circulation of absorbent.

These and other objects will become more apparent from the following description and drawing in which like reference characters denote like parts throughout the several views. It is to be expressly understood, however, that the drawing is for the purpose of illustration only and not a definition of the limits of the invention, reference being had for this purpose to the appended claims. In the drawing:

Fig. 1 is a diagrammatic view of an absorption refrigeration system incorporating the novel construction and arrangement of elements for reducing generator noise; and Fig. 2 is a partial sectional view of a generator of modified construction to which the invention may be applied.

Referring to the drawing, the present invention is shown in a vacuum type absorption refrigeration system generally of the type shown in United States Letters Patent to Albert R. Thomas et al. 2,282,503 issued May 22, 1942, entitled Refrigeration, and more specifically as shown in my prior Patent 2,563,575 issued August 7, 1951 entitled Absorption Refrigeration. Such a system utilizes a refrigerant such as water and an absorbent such as a water solution of lithium bromide. The absorption refrigeration system comprises a combined generator and vapor liquid-lift 5, a condenser 6, an evaporator 7, an absorber 8 and a liquid heat exchanger 9 interconnected for the circulation of refrigerant and absorbent.

The combined generator and vapor liquid-lift 5 as illustrated in Fig. 1 is of the climbing film type having a lower solution vessel 10, a separating chamber 11 above the vessel and a plurality of lift tubes 12 connecting the vessel and separating chamber. While a single lift tube 12 is shown in the drawing for purposes of illustration, it will be understood that a number of such tubes is usually provided equal in number to the capacity of the unit divided by the capacity of an individual tube. A shell 13 provides a heating chamber 14 surrounding the tubes throughout their length. The shell 13 has an inlet pipe 15 through which heating medium such as steam is supplied to the heating chamber 14 and a tube 16 adjacent the bottom thereof for draining condensate therefrom.

It will be understood that the invention is not limited to the climbing film type generator 5 illustrated in Fig. 1 but is applicable to other types of generators such as the droplet type lift 5' shown in Fig. 2 and described and claimed in my copending application for United States Letters Patent Serial No. 164,059 filed May 25, 1950 and entitled Refrigeration. The generator 5' illustrated in Fig. 2 comprises a vessel 10', a separating chamber 11' above the vessel and a single lift tube 12' for any desired capacity extending between the vessel and chamber. The vessel 10' may be heated by any suitable means and in the embodiment illustrated in Fig. 2 has a central flue 10a directly heated by the products of combustion from a suitable fuel burner 10b.

The top of the separating chamber 11 or 11' is connected to the condenser 6 by a vapor pipe 17. Condenser 6 may be of any suitable construction and as illustrated in Fig. 1 is a surface type comprising a chamber 18 through which tubes 19 extend between tube sheets in headers 20 and 21. Refrigerant liquefied in the condenser 6 flows by gravity through an orifice device 22 to the evaporator 7. The device 22 maintains the difference in pressure between the condenser 6 and evaporator 7 and comprises a chamber having a wall 23 with an orifice 24 therein through which liquid refrigerant and non-condensable gases flow as described and claimed in my prior Patent 2,563,575, referred to above.

Evaporator 7 comprises a plurality of finned tubes 25 extending between spaced headers 26. Cups 27 arranged alternately at opposite ends of adjacent tubes in headers 26, underlie the end of the next uppermost tube to direct liquid refrigerant for gravity flow through each of the tubes successively from the top to the bottom of the evaporator. The vapor from the liquid refrigerant evaporated in the tubes 25 flows into the headers 26 and from the headers into the absorber 8.

Absorber 8 comprises a vessel containing a plurality of serpentine coils 28 arranged vertically in side by side relationship and a liquid distributor 29 overlying the coils. The vertically arranged serpentine coils 28 provide a series of pipe sections 30 arranged one over the other and each pipe section has a series of drip-forming projections 31. Solution is delivered onto the uppermost pipe section 30 of each vertically arranged serpentine coil 28 from the liquid distributor 29 and drips from the drip-forming projections 31 onto the top of the next lowermost pipe section from the top to the bottom of the coil. Cooling water from a suitable source such as a cooling tower or city water main is delivered through a conduit 32 to a header 33 connecting a number of the serpentine coils 28 in parallel. The cooling water flows through the serpentine coils 28 and then from a header 34 through a conduit 35 to the header 20 of the condenser 6. Water from header 20 flows through the condenser tubes 19 to the header 21 and from the latter to a discharge conduit 36. Thus, cooling water flows through the absorber 8 and condenser 6 in series. Due to the high affinity of the refrigerant, water, for the absorption solution, lithium bromide, the refrigerant vapor is absorbed in the solution to reduce the vapor pressure of the refrigerant in the evaporator 7 and the temperature at which the refrigerant evaporates to produce a refrigerating effect. Air to be conditioned is caused to flow over the finned tubes 25 of the evaporator 7 where it is cooled and dehumidified.

The absorption solution circuit comprises an ascending portion including the chamber 10 and lift tubes 12 of the generator 5 and a descending portion including the separating chamber 11, absorber 8 and liquid heat exchanger 9 through which solution flows by gravity. The solution weak in refrigerant lifted into the separating chamber 11 by the lift tubes 12 flows by gravity to the liquid distributor 29 in the absorber 8 in a path of flow comprising conduit 37, outer passage 38 of liquid heat exchanger 9 and conduit 39. Solution strong in refrigerant flows from the bottom of the absorber 8 to the chamber 10 of generator 5 in a path of flow comprising conduit 40, inner passage 41 of liquid heat exchanger 9 and conduits later to be described in detail. Because of the difference in pressures in the generator 5 and absorber 8, respectively, pressure balancing liquid columns will be formed in the conduits 39 and 40. For example, during operation of the system a pressure balancing column of solution will exist in the conduit 39 above the level X in conduit 37 connected thereto through the liquid heat exchanger 9 and a pressure balancing column of solution will exist in the conduit 40 between the level Y and Z.

An automatic purging device of the type described and claimed in the United States Letters Patent of Charles A. Roswell, Re. 23,093 issued March 22, 1949 entitled Refrigeration is also provided. Suffice it to state herein that the purge device comprises a vessel 42 constituting an auxiliary absorber and having a cooling coil 43 therein connected in parallel with the cooling coils 28 in the absorber 8 and a liquid distributing means connected to conduit 39 to deliver absorption solution for gravity flow over the coil 43. A suction tube 44 is connected to vessel 42 and extends into the absorber 8 to a location where turbulence is at a minimum. A fall tube 45 depends from the bottom of the vessel 42 into a separating chamber 46 and the separating chamber, in turn, has a liquid connection 47 to the conduit 40 and a gas connection 48 to a gas storage vessel 49. As thus far described, the refrigeration system is substantially the same as that previously known and used.

In accordance with the present invention, a construction and arrangement of elements is provided in the solution circuit for materially reducing the condensate knocking noise in the generator while producing a controlled relative circulation of refrigerant and absorbent. This is accomplished by feeding solution to the generator at a constant fixed rate corresponding to the circulation rate desired and automatically adjusting the height of the hydrostatic column of solution constituting the reaction head in response to variations in pressure in the generator to prevent solution from backing out of the latter. The improved construction comprises a standpipe 50 connected to the chamber 10 of the generator 5 and having a small cross sectional area so that small quantities of solution will produce a substantial increase in the height of the liquid column therein. A conduit 51 connects the outlet from the inner passage 41 of liquid heat exchanger 9 to the standpipe 50 at a level above the highest liquid level expected to occur in the standpipe during operation of the system.

An outlet chamber 52 depends from the bottom of the absorber 8 and a septum plate 53 is provided between the absorber and outlet chamber. The septum 53 has an orifice 54 therein and a tube 55 for venting the outlet chamber to the interior of the absorber above the liquid level therein. The orifice 54 is designed to permit liquid to flow from the absorber 8 at the rate desired for relative circulation by the vapor liquid-lift 12 and the solution is continuously fed at a constant rate to the chamber 10 of the generator 5. Surplus solution required to compensate for variations in operating conditions is stored in the bottom of the relatively large absorber vessel 8 for flow through the orifice 54. Due to the large area of the absorber vessel 8, small changes in the amount of absorption liquid in the absorber at any particular time will only produce a negligible variation in the height of the hydrostatic head on the orifice 54 so that absorption liquid will flow through the orifice at a substantially constant rate. Absorption liquid being continuously fed through the orifice 54 to a level such as Y in conduit 40 will cause a corresponding amount of liquid to flow into standpipe 50 above the liquid level therein. To prevent an excessively high liquid level from building up in standpipe 50 between periods of operation, an overflow vessel 56 is provided at the top of the standpipe 50 above the connection of conduit 51 threwith and the top of the overflow vessel is connected by a vent conduit 57 to the separating chamber 11. The overflow vessel 56 is of such dimensions as to receive and store all of the surplus solution within its confines and for economy of space may be made of annular form to surround the generator 5, if desired.

A concentration control vessel 60 generally similar to that described and claimed in the McNeely Patent 2,465,904 issued March 29, 1949, is provided. Suffice to state that the concentration control vessel 60 is located at a height to produce a pressure balancing liquid column of the refrigerant water, above the level Z. A conduit 61 connects a cup 62 underlying the outlet end of the lowermost evaporator tube 25 to the side of the concentration control vessel 60. A vent conduit 63 connects the top of the vessel 60 to the interior of the absorber 8 and a conduit 64 connects the bottom of the vessel to the solution conduit 40 leading to the inner passage 41 of the liquid heat exchanger 9. One form of the invention having now been described in detail, the mode of operation is explained as follows.

To initiate operation of the refrigeration system illustrated in Fig. 1, either initially or after an off cycle period, heating medium is supplied to the heating chamber 14 of generator 5 through the conduit 15. When steam is used as a heating medium, its heat is transmitted through the walls of the riser tubes 12 to heat the solution therein and expel refrigerant vapor therefrom. The expelled vapor flows upwardly through the center of the tubes 12 at high velocity and lifts an annular column of solution on the walls of the tubes by frictional drag. The expelled vapor and solution are delivered from the lift tubes 12 into the separating chamber 11.

When the form of generator 5' illustrated in Fig. 2 is used, the direct fired burner 10b is ignited and the products of combustion flow through the flue 10a to heat the solution in the vessel 10' and expel refrigerant vapor therefrom. The rate of vapor generation is correlated to the cross sectional area of the single lift conduit 12' to maintain a body of vapor below the end of the lift tube 12'. Vapor flows from the vessel 10' at high velocity throughout the entire length of lift conduit 12' in continuous vapor phase and carries droplets of liquid suspended therein. In the separating chamber 11 or 11' suitable baffling means 11a separates the refrigerant vapor from the droplets of solution.

Vapor from the separating chamber 11 flows through vapor pipe 17 to the condenser 6 where it is condensed to a liquid at a vapor pressure corresponding to the cooling water temperature and the liquid refrigerant flows through the orifice 24 in device 22 into the uppermost tubes 25 of the evaporator 7. As the liquid refrigerant flows by gravity through successive tubes 25 of the evaporator 7 it evaporates at a low pressure and temperature corresponding to the vapor pressure of the refrigerant in absorbent at the temperature of the absorber 8 to produce a cooling effect on air flowing over the finned tubes.

Simultaneously with the flow of refrigerant vapor to the condenser 6, absorption solution weak in refrigerant lifted by the lift tubes 12 in the ascending portion of the absorption solution circuit flows by gravity from the separating chamber 11 to the liquid distributor 29 in absorber 8 in a path of flow comprising conduit 37, outer passage 38 of liquid heat exchanger 9 and conduit 39. Absorption solution flowing over the vertically arranged serpentine coils 28 of absorber 8 absorbs the refrigerant vapor flowing from the tubes 25 of evaporator 7 through the headers 26 into the absorber as fast as it is evaporated. The absorption solution strong in refrigerant accumulates in a pool in the bottom of the absorber 8 and flows by gravity through the orifice 54 in septum 53 at a constant controlled rate. As the liquid flows to the level Y a corresponding amount of liquid moves in a path comprising conduit 40, inner passage 41 of liquid heat exchanger 9 and conduit 51 to deliver solution at the same constant rate to the standpipe 50 above the liquid level therein. If the combined generator and liquid-lift 5 should at any instant be lifting liquid faster than the rate at which it is delivered through the orifice 54, the height of the liquid column in standpipe 50 constituting the reaction head on generator 5 will immediately decrease and the rate at which the liquid is lifted will be reduced as the rate at which liquid is lifted in a vapor liquid-lift is functionally related to the reaction head. Similarly, if the rate at which liquid is lifted in the combined generator and liquid-lift 5 should decrease, the reaction head or height of the liquid column in the standpipe 50 will rise and increase the rate of liquid circulation. Thus, the height of the liquid column and the reaction head acting on the lift 5 is automatically adjusted in response to pressure variations in the vessel 10 to lift liquid at the constant rate at which it is delivered through the orifice 54.

The reduction in generator noise results from the fact that if at any time a sudden increase in vaporization should occur in the generator 5 and any appreciable amount of solution tends to back out of the generator vessel 10 into the standpipe 50, the level of liquid in the latter will rise rapidly and provide an increase in hydrostatic head. Because of the small volume of the standpipe 50 relative to the volume of the chamber 10, a small amount of solution tending to back out of vessel 10 will interrupt the flow of solution toward the generator and produce a substantial increase in the height of the liquid column in the standpipe. This not only counteracts the tendency of solution to back out of the generator vessel 10 but it likewise increases the boiling point of the solution in the generator and thus offsets the tendency toward sudden vaporization. As little or no solution can back out of the vessel 10, less vapor can collapse in the standpipe 50 which substantially reduces the noise of condensate knocking occurring in constructions previously used.

If the cooling water temperature of the absorber 8 and condenser 6 are so high as to increase the evaporator temperature above that desired, liquid refrigerant will overflow from the lowermost tube 25 of evaporator 7 into the concentration control vessel 60. This overflow of liquid refrigerant will continue with a corresponding increase in the concentration of the absorption solution flowing in the absorption solution circuit until an equilibrium condition is produced where all of the refrigerant is evaporated as it flows through the evaporator. The tube 64 depending from the concentration control vessel 60 is connected to the conduit 40 leading to the heat exchanger 9 instead of the chamber 10 in the usual construction to prevent bouncing of the liquid in the concentration control vessel upon changes in the hydrostatic reaction head on the generator 5. Between periods of operation the stored liquid refrigerant will flow back into the absorption solution in the liquid heat exchanger 9 and will to some extent dilute the solution in the generator.

After a period of operation, solution in the absorber 8 will gradually flow through the orifice 54 and through the conduit 40, inner passage 41 of liquid heat exchanger 9 and conduit 51 into the standpipe 50 but the overflow vessel 56 at the top of the standpipe will receive the surplus solution to prevent a hydrostatic column of excessive height from building up in the standpipe 50. At the beginning of the next period of operation, the rate of liquid lifting will be controlled and the excessive noise resulting from a high reaction head will be avoided.

It will now be observed that the present invention provides a novel construction and arrangement of elements in the solution circuit of an absorption refrigeration system to reduce generator noise during operation of the system. It will also be observed that the present invention provides an arrangement for delivering solution to the vapor liquid lift at a constant rate and automatically varying the hydrostatic reaction head responsive to variations in pressure in the generator to circulate liquid in the circuit at a substantially constant rate. It will also be observed that the present invention provides a standpipe connected to the generator vessel which is of relatively small cross sectional area to quickly adjust the height of the hydrostatic column of solution therein constituting the reaction head. It will still further be observed that the present invention provides a simple and compact construction and arrangement of elements which may be economically manufactured.

While the invention is herein illustrated and described as applied to two different generator constructions, it will be understood that the invention may be applied to other generators and that modifications may be made in the construction and arrangement of the elements of the solution circuit without departing from the spirit or scope of the invention. Therefore, without limitation in this respect, the invention is defined by the following claims.

I claim:

1. In an absorption refrigeration system, a circuit for absorption solution having an ascending portion in which solution is lifted and a descending portion through which solution flows by gravity, a vapor liquid-lift in the ascending portion of the circuit, means for heating solution in the ascending portion of the circuit to expel refrigerant vapor, a standpipe connected to the ascending portion of the circuit for maintaining a hydrostatic reaction head of solution on the lift, the descending portion of the circuit being connected to the standpipe above the highest liquid level expected to occur therein during operation, and flow control means in the descending portion of the circuit for delivering absorption solution to the standpipe at a substantially constant rate, the liquid column in said standpipe automatically adjusting itself to the height required to lift the solution delivered thereto.

2. In an absorption refrigeration system, a circuit for absorption solution having an ascending portion in which solution is lifted and a descending portion through which lifted liquid flows by gravity, a vapor liquid-lift in the ascending portion of the circuit, means for heating solution in the ascending portion of the circuit to expel refrigerant vapor, a standpipe connected to the ascending portion of the circuit for maintaining a hydrostatic reaction head of solution on the liquid lift, the descending portion of the circuit being connected to the standpipe above the highest liquid level occurring therein after an initial period of operation of the system, and said standpipe having a small volume relative to said ascending portion so that solution tending to back out of the ascending portion will produce a large increase in the height of the liquid column in the standpipe.

3. In an absorption refrigeration system, a circuit for absorption solution having an ascending portion in which solution is lifted and a descending portion through which lifted liquid flows by gravity, a vapor liquid-lift in said ascending portion of the solution circuit, means for heating solution in the ascending portion of the solution circuit to expel refrigerant vapor, a standpipe connected to the ascending portion of the circuit for maintaining a hydrostatic head of solution on the lift, the lower end of said descending portion being connected to deliver solution to the standpipe, an orifice located in the descending portion of the circuit above the highest liquid level occurring in the standpipe after stabilized operation of the system has been attained for delivering solution to the standpipe at a substantially constant rate, and said standpipe having a small cross sectional area so that solution tending to back out of the ascending portion will immediately produce a substantial increase in the height of liquid column in the standpipe.

4. In an absorption refrigeration system, a circuit for absorption solution having an ascending portion in which solution is lifted and a descending portion through which lifted liquid flows by gravity, a vapor liquid-lift in said ascending portion having a vessel at the lower end thereof, means for heating solution in the ascending portion of the solution circuit to expel refrigerant vapor, a standpipe connected to said vessel for maintaining a hydrostatic reaction head of solution on the lift, the lower end of the descending portion of said circuit being connected to the standpipe above the highest liquid level occurring therein during stabilized operation of the system, an orifice in the depending portion of the circuit constructed to deliver solution to the standpipe and vessel at the desired circulation rate, and said standpipe having a small cross sectional area so that a sudden increase in pressure in the vessel will produce a corresponding increase in the height of the liquid column in the standpipe without any substantial quantity of solution backing out of the vessel.

5. In an absorption refrigeration system, a circuit for absorption solution having an ascending portion in which solution is lifted and a descending portion through which lifted solution flows by gravity, said ascending portion of the circuit having a vapor liquid-lift comprising a vessel, a separating chamber above the vessel and a riser connecting the vessel and chamber, means for heating solution in the ascending portion of the solution circuit to expel refrigerant vapor, a vent pipe directly connecting the vessel and separating chamber in which a column of solution is maintained to provide a hydrostatic reaction head on the riser, said vent pipe having a small volume relative to said vessel so that a small quantity of solution will produce a large increase in the height of the liquid column therein, the lower end of the descending portion of the solution circuit being connected to the vent pipe above the highest liquid level occurring therein after initial operation of the system, and an orifice in the descending portion of the circuit above its connection with the vent pipe for delivering solution to the ascending portion at the desired circulation rate.

6. In an absorption refrigeration system, a circuit for absorption solution having an ascending portion including a vapor liquid-lift and a descending portion including an absorber, a standpipe connected to the lower end of the ascending portion for maintaining a hydrostatic reaction head on the lift, said standpipe having a small cross sectional area so that pressure variations in the ascending portion will produce a corresponding variation in the height of the liquid column in the standpipe without a reverse flow of any substantial amount of solution from the ascending portion of the standpipe, said absorber constituting a reservoir vessel for surplus solution, a conduit connected to deliver solution from the absorber in the descending portion of the circuit to the standpipe in the ascending portion, and an orifice in the conduit located above the highest liquid livel occurring therein during stabilized operation for delivering solution to the ascending portion at a substantially constant rate.

7. In an absorption refrigeration system in accordance with claim 6 in which the absorber has a depending outlet chamber to which the conduit is connected, and a septum between the absorber and outlet chamber having the orifice for delivering solution at a substantially constant rate and a vent tube projecting upwardly into the absorber.

8. In an absorption refrigeration system in accordance with claim 6 in which the absorber has a depending outlet chamber, the conduit connecting the bottom of the chamber and the standpipe above the highest liquid level occurring therein during operation of the system, and a septum between the absorber and outlet chamber having the orifice for delivering solution at a substantially constant rate and a vent tube projecting upwardly into the absorber.

9. In an absorption refrigeration system, a circuit for absorption solution having an ascending portion including a vapor liquid-lift and a descending portion including an absorber, said vapor liquid-lift having an inlet vessel, a separating chamber above the inlet vessel and a riser connecting the vessel and chamber, a heating chamber enclosing the riser, means for supplying heating medium to the heating chamber, a standpipe connected to the inlet vessel and vented to the separating chamber for maintaining a hydrostatic head of solution on the riser, conduit means connecting the absorber to the standpipe above the highest liquid level occurring therein after initial operation of the system, and an orifice between the absorber and conduit for delivering solution to the vessel at a substantially constant rate.

10. In an absorption refrigeration system, a circuit for absorption solution having an ascending portion including a vapor liquid-lift and a descending portion including an absorber, said vapor liquid-lift having a vessel, a separating chamber above the vessel, a riser connecting the vessel and chamber, means for heating the solution in the vessel, a standpipe connected to the vessel and to the separating chamber for maintaining a hydrostatic reaction head of solution on the solution in the vessel, a conduit connecting the bottom of the absorber to the standpipe above the highest liquid level occurring therein after initial operation of the system, and a septum between the absorber and conduit having an orifice therein for delivering solution at a substantially constant rate.

References Cited in the file of this patent

UNITED STATES PATENTS

| | | |
|---|---|---|
| 2,353,859 | Thomas | July 18, 1944 |
| 2,393,630 | Grossman | Jan. 29, 1946 |
| 2,473,389 | Reid | June 14, 1949 |